United States Patent [19]

Smith

[11] Patent Number: 4,971,420
[45] Date of Patent: Nov. 20, 1990

[54] OPTICAL FIBRE CABLE

[75] Inventor: Lawrence I. Smith, London, England

[73] Assignee: Telephone Cables Limited, England

[21] Appl. No.: 515,070

[22] Filed: Apr. 26, 1990

Related U.S. Application Data

[63] Continuation of Ser. No. 283,588, Dec. 13, 1988, abandoned.

[30] Foreign Application Priority Data

Dec. 17, 1987 [GB] United Kingdom ............... 8729455

[51] Int. Cl.$^5$ ............................................... G02B 6/44
[52] U.S. Cl. .................................................. 350/96.23
[58] Field of Search ............... 350/96.20, 96.21, 96.23

[56] References Cited

U.S. PATENT DOCUMENTS

| 3,710,006 | 1/1973 | Davis | 350/96.23 |
| 4,365,865 | 12/1982 | Stiles | 350/96.23 |
| 4,371,234 | 2/1983 | Parfree et al. | 350/96.23 |
| 4,389,088 | 6/1983 | Trezequet | 350/96.23 |
| 4,552,432 | 11/1985 | Anderson et al. | 350/96.23 |
| 4,730,894 | 3/1988 | Arroy | 350/96.23 |
| 4,765,711 | 8/1988 | Obst | 350/96.23 |
| 4,913,516 | 4/1990 | Ikeda | 350/96.23 |

FOREIGN PATENT DOCUMENTS 0203538 3/1986 Fed. Rep. of Germany ... 350/96.23

Primary Examiner—John D. Lee
Assistant Examiner—Phan T. Heartney
Attorney, Agent, or Firm—Kirschstein, Ottinger, Israel & Schiffmiller

[57] ABSTRACT

An optical fibre cable especially for submarine use has a core (1) surrounded by a layer (5, 6, 7) of strength members which include both wires (6) and laser-welded metallic tubes (7) containing the optical fibers (5).

8 Claims, 1 Drawing Sheet

U.S. Patent    Nov. 20, 1990    4,971,420
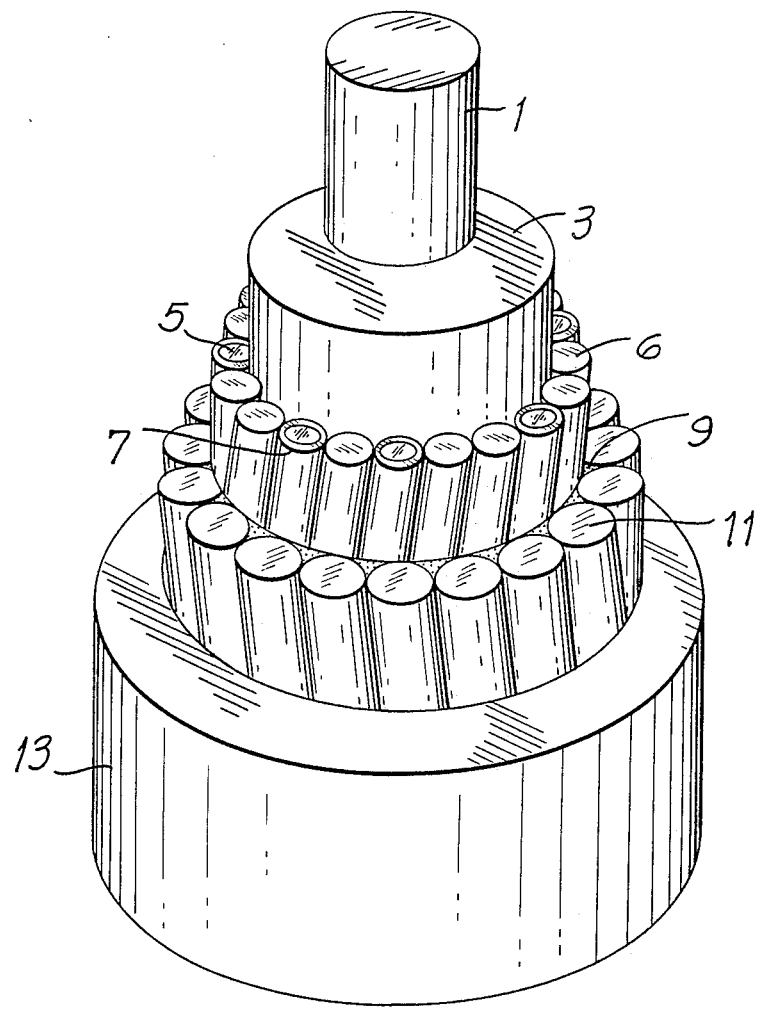

OPTICAL FIBRE CABLE

This is a continuation of application Ser. No. 07/283,588 filed Dec. 13, 1988 (abandoned).

BACKGROUND OF THE INVENTION

1. Field of the Invention

This invention relates to optical fibre cables, and especially to such cables to be used in underwater applications.

2. Description of Related Art

Underwater cables are required to have high strength and be resistant to high pressures, the action of the sea and damage from vessels. Conventionally, such cables are constructed with a fibre package protected by a seamless metal tube and layers of armouring wires. The metallic elements are insulated and protected by a thick polythene sheath. Where repeaters are needed, the power to the repeaters is supplied from the metallic elements. If the polythene sheath is damaged, there is a risk of the metallic elements being earthed. Thus, in order to provide satisfactory insulation of the wires, a thick sheath is used to encase the cable. The combined effect of the armouring wires and sheath is to produce a heavy and unwieldy cable.

SUMMARY OF THE INVENTION

It is an object of this invention to provide a cable which is smaller and lighter than conventional cables, whilst ensuring that there is no additional risk of earthing the metallic elements or of damage to the optical fibres.

According to the present invention, there is provided an optical fibre cable comprising a central cylindrical core, a layer of strength members at least one of which comprises a laser-welded metallic tube within which is encased at least one optical fibre, the layer overlaying the surface of the core, and sheathing means overlaying the first layer of strength members.

Preferably a second layer of strength members overlays the said layer of strength members, where high mechanical strength is required. Preferably the two layers of strength members are wound helically in opposite directions, however both layers may be wound in the same direction.

An additional insulating or bedding sheath layer may be provided between the two layers, making the cable easier to coil and handle.

The core may comprise a central conducting member surrounded by an inner sheath, preferably formed of low density polythene, the conducting member then providing the conductor which carries current for operating the repeaters. This means that the thickness of the outer sheathing means, commonly of extruded plastics material, can be reduced, compared with known submarine cables, as it merely serves to provide electrical insulation.

Alternatively, to provide a cheaper cable, if no power feeding is required the core may be solid and non-conducting.

Conveniently, there is a water blocking compound between the two layers of strength members and a layer of water-blocking compound between the optical fibres and the laser welded tube. This compound in the laser welded tubes may be a thixotropic grease.

BRIEF DESCRIPTION OF THE DRAWING

One embodiment of the invention will now be described by way of example only, with reference to FIG. 1 which shows a section of the cable.

DETAILED DESCRIPTION OF THE PREFERRED EMBODIMENT

The central copper conductor 1 is surrounded by a layer of low density polythene which constitutes the inner sheath 3. A first layer of high tensile steel wires 6 is wound helically about the inner sheath 3, a number of optical fibres 5 encased in laser welded stainless steel tubes 7 being interspersed between the wires 6. The steel tubes 7 and the wires 6 have the safe diameter.

A second layer of high tensile steel wires 11 is wound helically around the first layer in the opposite direction with a quantity of silicone water blocking compound 9 between the layer. The cable is encased in an outer sheath 13 formed of medium density polythene.

The stainless steel tubes 7 protect the respective optical fibres 5 from damage; each tube replaces an armouring wire. Thus there is no need for a separate optical fibre package within the tube, enabling a lighter and more compact cable to be produced.

Typically, stainless steel tubes of 1 mm to 6 mm diameter are used. These are filled with thixotropic grease and laser welded longitudinally to enclose the optical fibre. The tubes provide moderately hard, hermetically sealed fibre packages.

The length of the helical layer of the first layer may be varied depending on the fibre strain relief required in the cable.

I claim:

1. An optical fibre cable for underwater use, comprising a central cylindrical core having a tensile strength and an outer surface, a layer of strength members overlaying the outer surface of the core, said layer of strength members including a plurality of steel wires having interspersed among them at least one laser-welded steel tube within which is encased an optical fibre, said steel wires and said at least one steel tube together having a tensile strength that is greater than the tensile strength of the core to strengthen the cable, and sheathing means overlaying the layer of strength members.

2. A cable according to claim 1, in which each steel tube has the same diameter as the other strength members of the said layer.

3. A cable according to claim 1, comprising a second layer of strength members overlaying the layer of strength members.

4. A cable according to claim 1, in which the two layers are wound helically.

5. A cable according to claim 4, in which the two layers are wound helically in opposite directions.

6. A cable according to claim 3, comprising a water-blocking compound between the two layers of strength members.

7. A cable according to claim 1, in which the central cylindrical core is a central conducting member surrounded by an inner sheath.

8. A cable according to any claim 1, in which a layer of water-blocking compound is provided between the optical fibre and the respective steel tube.

* * * * *